(12) United States Patent
Han et al.

(10) Patent No.: US 10,805,224 B2
(45) Date of Patent: Oct. 13, 2020

(54) PARALLEL SCHEDULING METHOD AND PARALLEL SCHEDULING APPARATUS

(71) Applicant: ELECTRONICS AND TELECOMMUNICATIONS RESEARCH INSTITUTE, Daejeon (KR)

(72) Inventors: Kyeong Eun Han, Daejeon (KR); Dae Ub Kim, Daejeon (KR); Chan Sung Park, Sejong-si (KR); Jong Tae Song, Daejeon (KR); Kwang Joon Kim, Daejeon (KR); Joon Ki Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 111 days.

(21) Appl. No.: 16/122,200

(22) Filed: Sep. 5, 2018

(65) Prior Publication Data

US 2019/0182173 A1 Jun. 13, 2019

(30) Foreign Application Priority Data

Dec. 13, 2017 (KR) ........................ 10-2017-0170955

(51) Int. Cl.
*H04L 12/863* (2013.01)
*H04L 12/841* (2013.01)
*H04L 12/935* (2013.01)

(52) U.S. Cl.
CPC ........ *H04L 47/6225* (2013.01); *H04L 47/283* (2013.01); *H04L 49/3027* (2013.01); *H04L 49/3045* (2013.01); *H04L 49/3063* (2013.01)

(58) Field of Classification Search
CPC ............... H04L 47/6225; H04L 47/283; H04L 49/3045; H04L 49/3063; H04L 49/3027
See application file for complete search history.

(56) References Cited

U.S. PATENT DOCUMENTS 6,813,274 B1 * 11/2004 Suzuki .................. H04L 49/101
370/386
7,274,700 B2 9/2007 Jin et al.
(Continued)

FOREIGN PATENT DOCUMENTS

KR 10-0468946 B1 2/2005

OTHER PUBLICATIONS

Eiji Oki et al., "PMM: A Pipelined Maximal-Sized Matching Scheduling Approach for Input-Buffered Switches", Global Telecommunications Conference, 2001. GLOBECOM '01. IEEE.

*Primary Examiner* — Gbemileke J Onamuti
(74) *Attorney, Agent, or Firm* — LRK Patent Law Firm

(57) ABSTRACT

A parallel scheduling apparatus includes an information managing unit generating a first request information for scheduling, a first scheduling unit performing first scheduling and then generating first matching information on the basis of the first request information, and a second scheduling unit performing second scheduling on the basis of the first request information and the first matching information. The parallel scheduling has an advantage of improving the scheduling performance and lowering the implementation complexity, ensuring low delay and transmission fairness among VOQs at low input traffic, being applied to all scheduling algorithms that perform existing multi-iterations, and providing efficient scheduling in a packet switch having a long RTT time or having a very short time slot or cell size, such as an optical switch.

18 Claims, 6 Drawing Sheets

(56) References Cited

U.S. PATENT DOCUMENTS

2007/0133585 A1    6/2007   Minkenberg et al.
2008/0267074 A1   10/2008   Choi et al.
2016/0127810 A1*   5/2016   Lea .......................... H04J 14/02
                                                        398/51

* cited by examiner

PARALLEL SCHEDULING METHOD AND PARALLEL SCHEDULING APPARATUS

CROSS REFERENCE TO RELATED APPLICATION

The present application claims priority to Korean Patent Application No. 10-2017-0170955, filed Dec. 13, 2017, the entire content of which is incorporated herein for all purposes by this reference.

BACKGROUND OF THE INVENTION

1. Field of the Invention

The present disclosure relates generally to a parallel scheduling method and a parallel scheduling apparatus and, more particularly, to parallel processing scheduling capable of being applied to a packet switch, an optical switch, and the like.

2. Description of Related Art

In order for the input data of a packet switch and an optical switch to be transmitted as an output without collision, input and output scheduling is indispensable. A scheduling algorithm for switching should be able to provide high throughput, low delay, and fairness among virtual output queues (VOQs). However, when the implementation complexity of the scheduling algorithm is high, the scheduling time becomes long so that speed and performance of the switch are restricted. Accordingly, the hardware has to be easy to implement. A typical maximal matching algorithm, such as existing iterative round-robin with SLIP (iSLIP) or dual round-robin matching (DRRM), has been widely used as a packet switching algorithm. In particular, the DRRM method operating in two stages of a request and a grant is considered as an algorithm that is more suitable for implementing a large-capacity single switch than iSLIP, because hardware is easy and simple to implement.

On the other hand, the size of time slot or cell for packet switching has becomes smaller, and with this trend, the size of the time slot has become very short, e.g., several tens to several hundreds of nano (ns). Thus, existing scheduling algorithms that complete scheduling within a single time slot have to complete scheduling within tens to hundreds of nanoseconds. As the size of the switch increases, the number of input/output nodes to be scheduled increases and therefore, the scheduling time increases. Considering even delay of a round-trip time (RTT) needed to transmit and receive scheduling information, a restraint occurs in that all the scheduling procedures have to be completed within one time slot.

In order to solve this problem, various pipelined parallel processing scheduling methods have been proposed. However, there are disadvantages in that parallel processing scheduling methods in the related art cause an increase in delay and difficulties in guaranteeing fairness among VOQs at low input traffic despite of simple implementation, and despite of improvement of performance thereof, have a high implementation complexity.

SUMMARY OF THE INVENTION

Accordingly, the present invention has been made keeping in mind the above problems occurring in the related art, and an object of the present invention is to provide a parallel scheduling method and a parallel scheduling apparatus that can ensure low delay and fairness among VOQs with low implementation complexity as compared with the related arts, thereby making it possible to use a network resource efficiently and improve network performance.

It is another object of the present invention to provide a method of updating VOQ information for a two-stage parallel processing scheduling unit and a method of applying a grant-aware scheduling algorithm in which output grant information is reflected in a request for the next iteration.

A parallel scheduling apparatus according to an embodiment of the present invention includes an information managing unit generating first request information for scheduling, a first scheduling unit performing first scheduling and then generating first matching information on the basis of the first request information, and a second scheduling unit performing second scheduling on the basis of the first request information and the first matching information.

The second scheduling unit may include k−1 allocators, and the second scheduling may be performed by one allocator selected from among the k−1 allocators, where the k is the total number of scheduling allocators.

The first scheduling unit may generate second request information except at least one input and at least one output that have already completed scheduling on the basis of the first request information and the first matching information, and the one allocator selected in the second scheduling unit may perform the second scheduling on the basis of the second request information.

In addition, the one allocator selected to perform the second scheduling may generate second backward information except at least one input and at least one output that have already completed scheduling on the basis of the first request information and the first matching information, and perform the second scheduling on the basis of the generated second request information.

The information managing unit may update VOQ state information on the basis of the first backward information generated in the first scheduling unit and/or the second backward information generated in the second scheduling unit.

The first backward information may be VOQ state information that is not subject to second scheduling among VOQ state information of inputs that are unsuccessful in scheduling as a result of the first scheduling, and the second backward information is VOQ state information of inputs that are unsuccessful in scheduling as a result of the second scheduling.

The one allocator selected to perform the second scheduling may transmit grant information indicating matching result and information obtained by performing the second scheduling to the information managing unit after completing scheduling.

The information managing unit may update the VOQ state information on the basis of the first request information and the first backward information.

A parallel scheduling method according to an embodiment of the present invention includes a step of generating first request information for scheduling, a first scheduling step of performing first scheduling and then generating first matching information on the basis of the first request information, and a second scheduling step of performing second scheduling on the basis of the first request information and the first matching information.

The second scheduling step may be performed by a second scheduling unit including k−1 allocators, and the second scheduling step is performed by one allocator selected from among the k−1 allocators.

In addition, the first scheduling step may include a step of generating second request information except at least one input and at least one output that have already completed scheduling, on the basis of the first request information and the first matching information.

In addition, the second scheduling step may include a step of generating second request information except at least one input and at least one output that have already completed scheduling in the second scheduling step, on the basis of the first request information and the first matching information.

In addition, in the second scheduling step, second matching information may be generated on the basis of the second request information after performing the second scheduling.

In addition, VOQ state information may be updated on the basis of the first backward information generated in the first scheduling unit and the second backward information generated in the second scheduling unit.

In addition, the second scheduling step may include a step of generating the backward information obtained as a result of the second scheduling and grant information indicating a result of the first scheduling and the second scheduling after completing scheduling. The parallel scheduling method according to an embodiment of the present invention may include a step of updating VOQ state information on the basis of the first request information, the first backward information and/or the second backward information.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
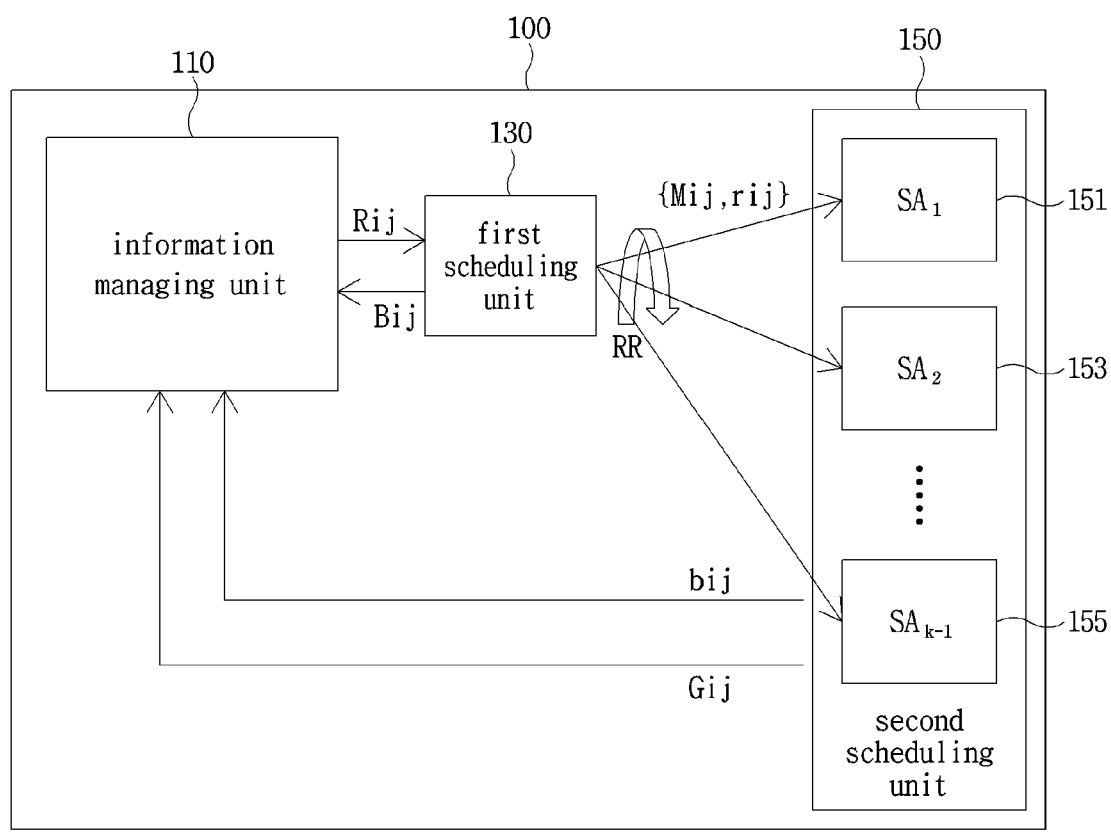
FIG. 1 is a block diagram illustrating a parallel scheduling apparatus according to an embodiment of the present invention.

While the invention is capable of being variously modified and altered, specific embodiments thereof are shown by way of example in the drawings and will herein be described in detail. It is to be understood, however, that the invention is not to be limited to the specific embodiments, but includes all modifications, equivalents, and alternatives falling within the spirit and scope of the invention. Similar reference numerals are used to indicate similar components in the drawings.

Terms such as first, second, and the like may be used to describe various components, but the components should not be limited by these terms. The terms are used only for the purpose of distinguishing one component from another. For example, without departing from the scope of the present invention, the first component may be referred to as a second component, and similarly, the second component may also be referred to as a first component. The term "and/or" includes any combination of a plurality of related listed items or any of a plurality of related listed items.

It is to be understood that when a component is referred to as being "connected" or "coupled" to another component, the component may be directly connected or coupled to the other component, but it is to be understood that there may be other components in between. On the other hand, when a component is referred to as being "directly connected" or "directly coupled" to another component, it is to be understood that there are no other components in between.

The terminology used herein is for the purpose of describing particular embodiments only and is not intended to be limiting of the invention. The singular forms include plural referents unless the context clearly dictates otherwise. In this application, the terms "comprise" or "have", etc., are used to specify that there is a stated feature, figure, step, operation, element, part or combination thereof, but do not preclude the presence or addition of one or more other features, integers, steps, operations, components, parts, or combinations thereof.

Hereinafter, embodiments of the present invention will be described in detail with reference to the accompanying drawings. Hereinafter, the same reference numerals are used for the same components in the drawings, and redundant explanations for the same components are omitted.

The parallel processing scheduling according to the present invention may be classified into (1) a structure based on two types of sub-schedulers and an operating method thereof, (2) a scheduling method and procedures thereof, (3) a method of processing and updating virtual output queue (VOQ) information, (4) information exchanged between sub-schedulers and exchanging procedures thereof, and (5) a method of applying a grant-aware scheduling algorithm.

First, a parallel scheduling apparatus 100 according to an embodiment of the present invention based on two types of sub-schedulers will be described. FIG. 1 is a block diagram illustrating a parallel scheduling apparatus 100 according to an embodiment of the present invention.

Referring to FIG. 1, the parallel scheduling apparatus 100 may include an information managing unit 110, a first scheduling unit 130, and a second scheduling unit 150. The second scheduling unit 150 may include k−1 allocators of $SA_1$ 151, $SA_2$ 153 to $SA_{k-1}$ 155, where k denotes the total number of allocators.

The information managing unit 110 generates request information Rij to perform scheduling on all inputs i and outputs j on the basis of all VOQ state information received for each time slot. Also, the information managing unit 110 updates the VOQ state information on the basis of the generated request information Rij and the first backward information Bij and/or the second backward information bij that are received from the first scheduling unit 130 and each allocator 151, 153, or 155, and then transmits the scheduling result to the input nodes on the basis of time slot allocation information or grant information Gij received after completing the scheduling.

The first backward information Bij generated by the first scheduling unit 130 is virtual output queue (VOQ) state information that is not subject to second scheduling among VOQ state information of the inputs that are unsuccessful in scheduling as a result of the first scheduling. The second backward information bij generated by the second scheduling unit 150 is virtual output queue state information of inputs that are unsuccessful in scheduling as a result of the second scheduling in the second scheduling unit 150.

For each time slot, the VOQ information of all nodes received in the information managing unit 110 is managed as the previous VOQ information and the current VOQ information, which represent an amount of traffic stored in the VOQ of each input node. Based on the VOQ information, the information managing unit 110 sets the request information Rij to '1' when there is data to be transmitted to the VOQ for scheduling, and to '0' when there is no data to be transmitted to the VOQ. When the request information Rij is '1', the corresponding VOQ is decreased by '1' to update the VOQ state, and the set request information Rij is transmitted to the first scheduling unit 130.

The first scheduling unit 130 and the second scheduling unit 150 correspond to the two types of sub-schedulers described above. According to an embodiment of the present invention, a total of M iterations are performed by the first scheduling unit 130 and the second scheduling unit 150.

Herein, each allocator 151, 153, or 155 configuring the second scheduling unit 150 receives the second request information rij used when scheduling is performed by the first scheduling unit 130 and matching information Mij generated as a result of scheduling by the first scheduling unit 130, and then performs continuous scheduling for the remaining iteration. That is, the iterations are performed by one scheduling unit in the related art. Meanwhile, the iterations are performed by the first scheduling unit 130 and the second scheduling unit 150 in the present invention.

In addition, each allocator 151, 153, or 155 configuring the second scheduling unit 150 may generate the second request information rij by itself and perform scheduling based on the generated second request information rij.

Figure 2:
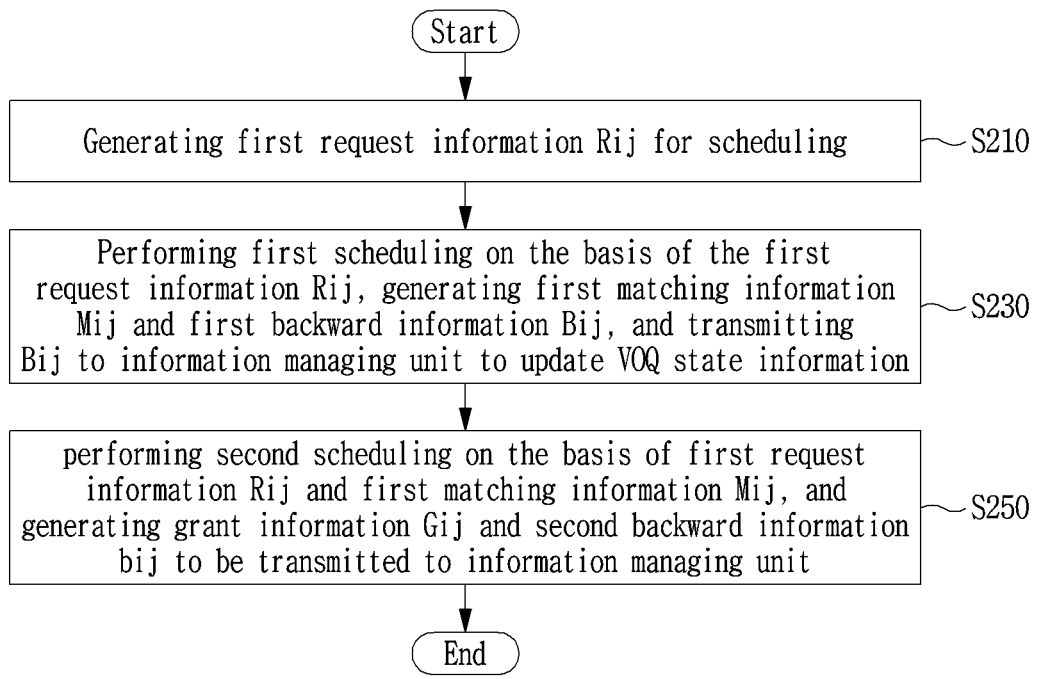
FIG. 2 is a flowchart illustrating an example of a parallel scheduling method according to the present invention.

FIG. 2 is a flowchart illustrating an example of a parallel scheduling method performed by the parallel scheduling apparatus 100 according to the present invention. Referring to FIG. 2, an outline of a parallel scheduling method according to an embodiment of the present invention will be described.

First, the information managing unit 110 generates the first request information Rij for scheduling (S210), and then transmits the generated first request information Rij to the first scheduling unit 130. However, according to an embodiment, the first request information Rij generated by the information managing unit 110 may be transmitted to the second scheduling unit 150 as well as the first scheduling unit 130.

As described above, the information managing unit 110 generates the first request information Rij for scheduling; updates the VOQ state information on the basis of the first request information and the first scheduling unit 130 and the backward information Bij and bij from the first scheduling unit 130 and each allocator 151, 153, or 155; and transmits the scheduling result to the input nodes on the basis of the grant information Gij after completing the scheduling.

The first scheduling unit 130 performs the first scheduling on the basis of the first request information Rij and then generates the first matching information Mij and the first backward information Bij, and transmits the first backward information Bij to the information managing unit 110 to update the VOQ state information (S230). The first scheduling unit 130 performs a scheduling algorithm by the number of iterations that may be performed during one time slot including the first iteration. The remaining iterations are performed by the second scheduling unit 150. Accordingly, the first iteration in the scheduling algorithm for allocating all time slots is always performed by the first scheduling unit 130.

The first scheduling unit 130 transmits the backward information Bij to the information managing unit 110 when the scheduling is completed and transmits the matching information Mij and the first request information Rij received from the information managing unit 110 for scheduling to the second scheduling unit 150. However, when the first request information Rij has been already transmitted to the second scheduling unit 150 by the information managing unit 110, the first scheduling unit 130 may not transmit the first request information Rij to the second scheduling unit 150.

The information managing unit 110 receives the first backward information Bij and then updates VOQ state information Lij based on the information. The state information Lij is updated on the basis of the first request information Rij and the first backward information Bij or the second backward information bij received from the first scheduling unit 130 or each allocator 151, 153, or 155, when the VOQ state information received from the input node increases for each time slot. The information managing unit 110 reduces the current queue state on the basis of the first request information Rij and increases the current queue state on the basis of the backward information Bij and bij received from the first scheduling unit 130 and each allocator 151, 153, or 155 of the second scheduling unit 150, whereby the scheduling results are reflected in the VOQ state so that the next request information more accurately reflects the current VOQ state. The first scheduling unit 130 sequentially performs selection according to a round-robin (RR) scheme, in order to select one allocator 151, 153 or 155 that is used to perform the next scheduling.

Next, the first scheduling unit 130 provides the second request information rij and the first matching information Mij to the second scheduling unit 150. Herein, the second request information rij at time t is the same information as the first request information Rij input from the information managing unit 110 to the first scheduling unit 130 at time t−1. According to the implementation method, the first scheduling unit 130 may generate and transmit the second request information for which the second scheduling unit 150 performs scheduling by using the first request information Rij and the first matching information Mij. In this case, rij may not be equal to Rij.

The second scheduling unit 150 performs the second scheduling on the basis of the second request information rij, i.e., the first request information Rij and the first matching information Mij (S250). Each allocator 151, 153, or 155 of the second scheduling unit 150 generates new request information using the second request information rij and the matching information Mij of the first scheduling unit 130 that are received and performs the remaining iterations according to the resulting scheduling of the first scheduling unit 130.

Herein, each allocator 151, 153, or 155 excludes all inputs i and outputs j that have already completed matching from scheduling targets in the second request information rij. In one embodiment, each allocator 151, 153, or 155 sets all the VOQ states of the inputs i that have already completed matching to '0' and updates the information corresponding to the outputs j that have already completed matching to '0'. That is, a value of Ri is updated to '0' and a value of Rj is updated to '0', for the input i and output j.

In addition, the number of iterations performed by one allocator may be determined according to an implementation method. Here, one allocator may mean one of the first scheduling unit 130 and each allocator 151, 153, or 155 of the second scheduling unit 150. In one embodiment, the number of iterations performed by one allocator may be a value acquired by dividing the total number of iterations, M, by the number of allocators, k.

Upon completion of the scheduling, each allocator 151, 153, or 155 combines the matching information transmitted from the first scheduling unit 130 with its own matching information, and transmits the resulting grant information Gij and the second backward information bij to the information managing unit 110. In one embodiment, each allocators 151, 153, or 155 may integrate the iteration results performed each time an iteration is completed, or for each time slot, or transmit the backward information bij of each allocator 151, 153 or 155 to the information managing unit 110 at the point of time when all the scheduling is completed. Although the grant information Gij is transmitted to the information managing unit 110 by each allocator 151, 153, or 155, the grant information Gij may be configured based on the matching information Mij by the information managing unit 110 according to the implementation method. Also, the first request information Rij may be directly transmitted from the information managing unit 110 to each allocator 151, 153, or 155.

Next, an example of the operations of the first scheduling unit 130 and the allocators 151, 153, or 155 in the second scheduling unit 150 will be described with reference to FIG. 3.

Figure 3:
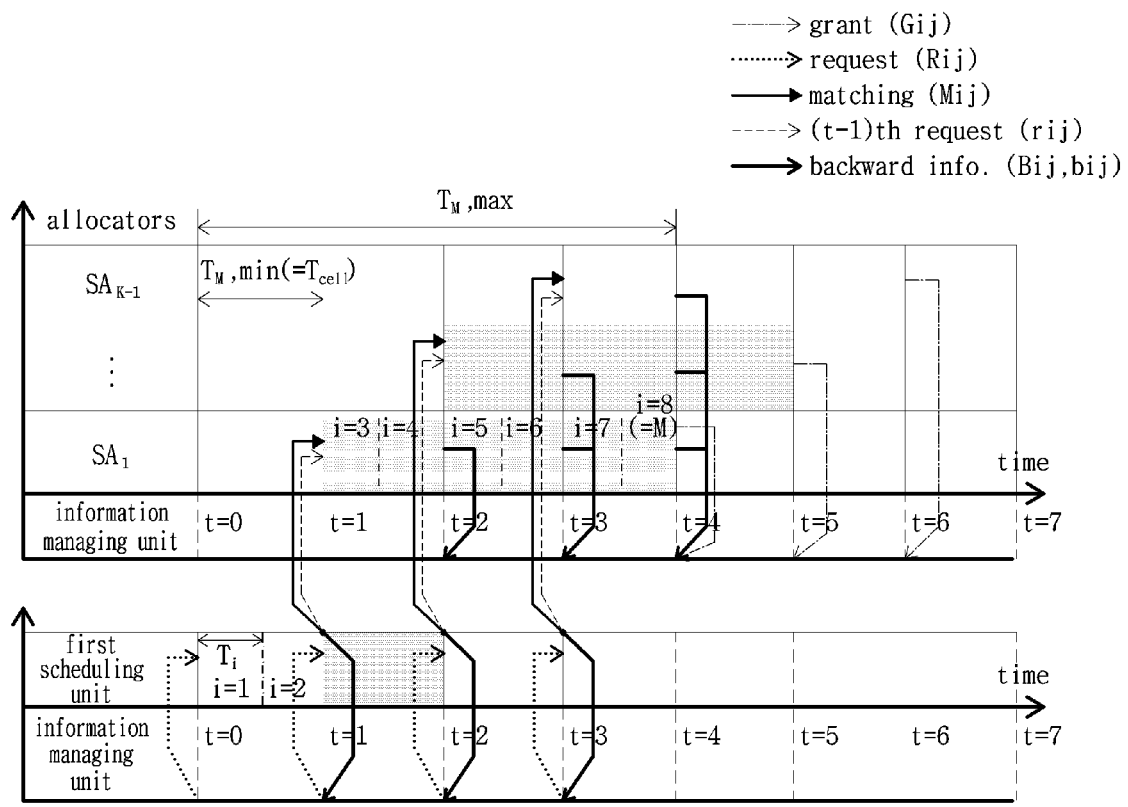
FIG. 3 is a diagram illustrating an example of a specific operation of the parallel scheduling apparatus according to the present invention.

FIG. 3 is a diagram illustrating an example of a specific operation of two-stage parallel processing scheduling apparatus according to the present invention. In this embodiment, it is assumed that the number of iterations performed during one time slot is two and the total number of iterations is eight (M=8). In this case, the number of allocators required is a value, i.e., 4, obtained by dividing the total number of iterations by the number of iterations that may be performed during one time slot. Therefore, under the assumption that a total of four allocators are required, including the first scheduling unit 130 and three allocators of the second scheduling unit 150, FIG. 3 shows operations of the allocators. That is, a value of k is 4 in the FIG. 3.

First, for each time slot, the information managing unit 110 transmits the request information Rij to the first scheduling unit 130 on the basis of the VOQ state information. According to the implementation method, the request information Rij may be transmitted to the first scheduling unit 130 and each allocator 151, 153 or 155 for each time slot.

After receiving the request information Rij, the first scheduling unit 130 performs twice the scheduling algorithm for input/output matching, and then selects a $SA_1$ 151 from among a plurality of allocators 151, 153, and 155 according to a round-robin scheme. The first scheduling unit 130 transmits the scheduling matching result Mij and the corresponding request information rij to the $SA_1$ 151 and transmits the backward information Bij to the information managing unit 110 after the scheduling is completed. The first scheduling unit 130 resets the input/output information and then completes the scheduling for the next scheduling.

At the next time slot, the first scheduling unit 130 receives the new request information Rij from the information managing unit 110 in order to perform the next scheduling. Each allocator 151, 153, or 155 excludes input i and output j that have already allocated on the basis of the request information rij and the matching information Mij received from the first scheduling unit 130, and then performs scheduling based on the request information reflecting the exclusion.

After the scheduling is completed at each allocator 151, 153 or 155, the backward information bij is transmitted to the information managing unit 110 to be reflected in the VOQ state information. According to other embodiment, while performing scheduling during the remaining iterations, each of allocator 151, 153, or 155 may generate the backward information bij based on the allocation matching information Mij that has completed iteration each time an iteration is completed or for each time slot and then transmit the generated backward information to the information managing unit 110 to be reflected in the VOQ state information.

Each allocator 151, 153, or 155 that has completed scheduling transmits the backward information bij and the grant information Gij including the scheduling result of the first scheduling unit 130 to the information managing unit 110. In the embodiment shown in FIG. 3, the $SA_1$ 151 receives the matching information Mij and the request information rij at t=1, and performs scheduling from the third iteration to M-2th iteration for not-yet-allocated output j and not-granted input i. At t=4, the $SA_1$ 151 completes scheduling initiated from the first scheduling unit 130 and transmits the backward information Bij and the grant information Gij to the information managing unit 110.

When the new request information Rij is transmitted to the first scheduling unit 130 at the next time slot (t=1), the first scheduling unit 130 performs scheduling on the new request information Rij according to an input/output arbiter, and transmits the matching information Mij and the request information rij to a $SA_2$ 153 selected according to the round-robin scheme.

Like the $SA_1$ 151, the $SA_2$ 153 performs scheduling based on the matching information Mij and the request information rij received from the first scheduling unit 130 for the remaining iterations. The operation of the $SA_2$ 153 and the scheduling method of the $SA_{k-1}$ 155 corresponding to $SA_3$ are the same as those of the $SA_1$ 151. The request information Rij transmitted to the first scheduling unit 130 for each time slot is information in which the backward information Bij and bij of the first scheduling unit 130 and each allocator 151, 153, or 155 generated as a result of scheduling at the previous time slot are reflected. The matching information Mij may be transmitted to the information managing unit 110 in various ways according to the implementation method.

Figure 4:
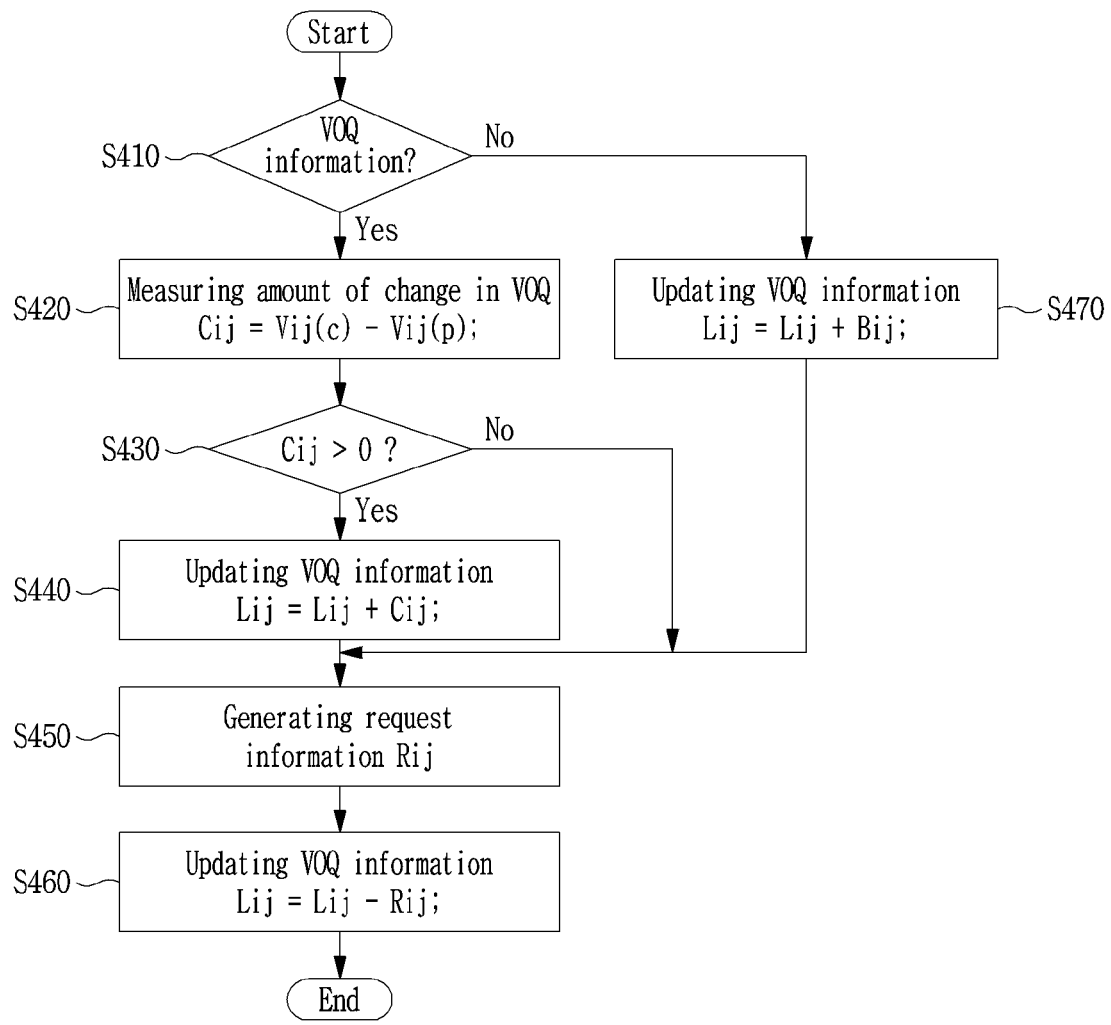
FIG. 4 is a diagram illustrating a process of updating VOQ information by the information managing unit of the parallel scheduling apparatus according to the present invention.

FIG. 4 is a diagram illustrating a process of updating VOQ information by the information managing unit 110 according to an embodiment of the present invention The information managing unit 110 receives all the VOQ information from each input node for each time slot. The information managing unit 110 configures the VOQ state information Lij for efficient scheduling based on the received VQO information. The VOQ state information Lij is updated by the VOQ information Vij that is queue state information for scheduling, the request information Rij generated based thereon, or the backward information Bij or bij generated after scheduling.

When the VOQ information Vij is received from each input node (S410), the information managing unit 110 compares the previous VOQ information Vij(p) with the currently received VOQ information Vij(c) (S420). It is determined whether or not an amount of VOQ increases (S430). When the amount of VOQ has increased (that is, Cij>0), the information managing unit 110 adds the amount of increase Cij to the current VOQ state information Lij to update VOQ state information (S440). When the amount of VOQ is equal to or less than the previous VOQ state, the current value is maintained. On the basis of the updated current VOQ state, scheduling request information Rij that is to be transmitted to the first scheduling unit 130 is generated (S450). By subtracting the request information Rij from the current VOQ state information Lij, the VOQ information is updated (S460). When the backward information Bij is received from the first scheduling unit 130 and each allocator 151, 153 or 155, the information managing unit 110 increases the current VOQ state information Lij by the backward amount, that is, Bij, to update VOQ state information Lij (S470).

The updated VOQ state information Lij is reflected in new request information Rij that is to be transmitted to the first scheduling unit 130, and the first scheduling unit 130 always receives the request information Rij reflecting the matching information to perform scheduling.

Figure 5:
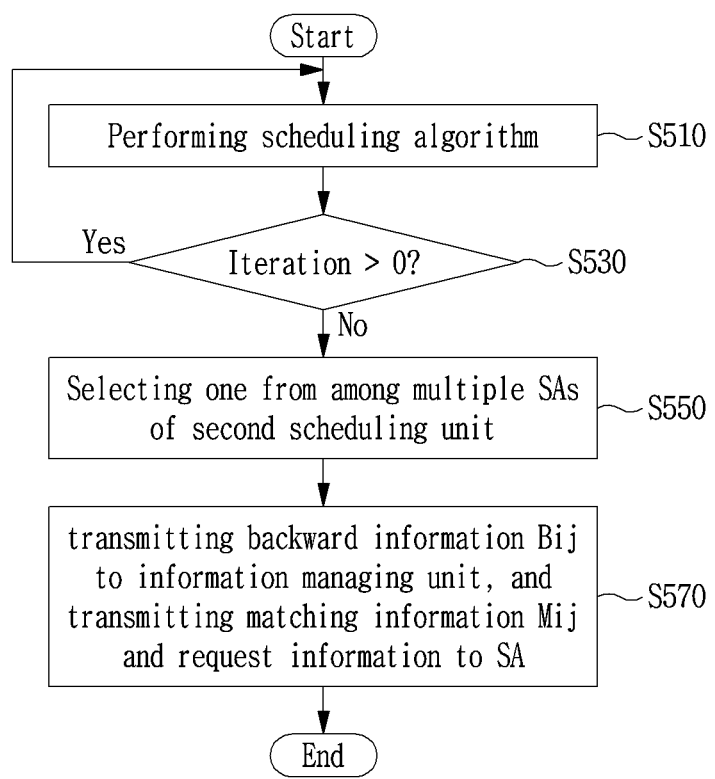
FIG. 5 is a flowchart illustrating an operation of the first scheduling unit of the parallel scheduling apparatus according to the present invention.

FIG. 5 is a flowchart illustrating an operation of the first scheduling unit 130 according to an embodiment of the present invention First, the first scheduling unit 130 repeatedly performs scheduling for a predetermined number of iterations based on the request information received from the information managing unit 110 for each time slot (S510). When scheduling is completed, the next allocator used to perform scheduling in succession is selected from among a plurality of SAs 151, 153, or 155 in the second scheduling unit 150 (S550). The SA used to perform the next scheduling may be sequentially selected one by one according to a round-robin scheme.

The first scheduling unit 130 transmits the scheduling backward information Bij to the information managing unit 110, and transmits the matching information Mij and the request information rij used for scheduling to each allocator 151, 153, or 155 (S570). The first scheduling unit 130 resets the request information Rij and then receives the new request information Rij to perform scheduling.

Figure 6:
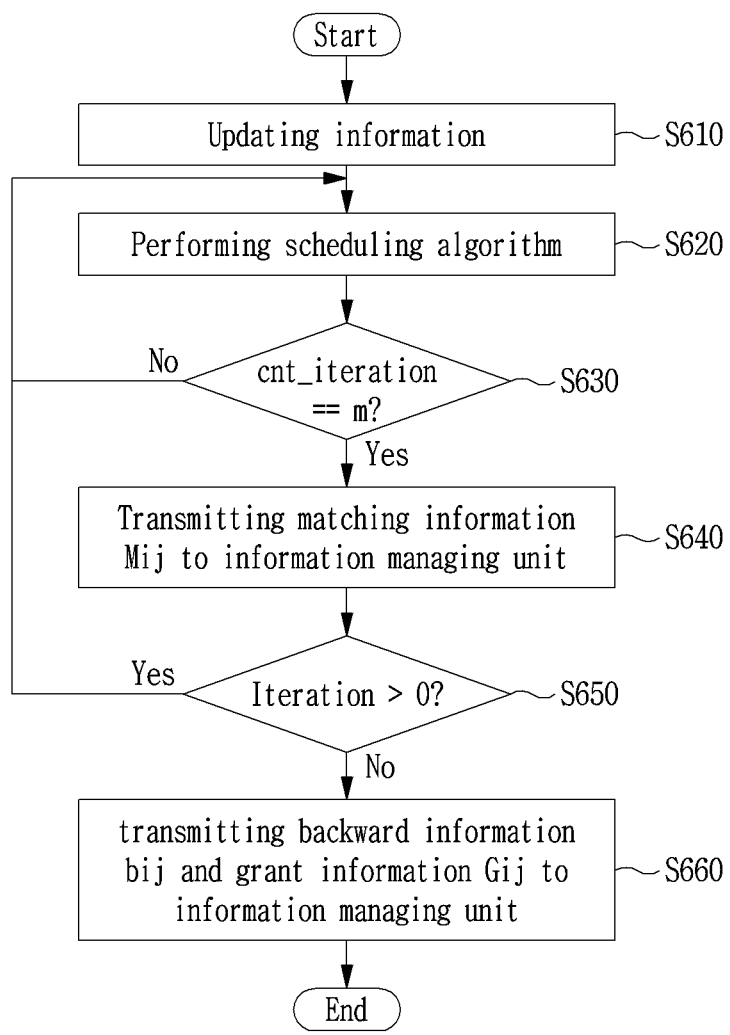
FIG. 6 is a flowchart illustrating an operation of each allocator of the second scheduling unit of the parallel scheduling apparatus according to the present invention.

FIG. 6 is a flowchart illustrating an operation of each allocator 151, 153, or 155 of the second scheduling unit 150 according to an embodiment of the present invention. Each allocator 151, 153, or 155 updates the scheduling information on the basis of the matching information Mij and the corresponding request information rij received from the first scheduling unit 130 (S610). Herein, each allocator 151, 153, or 155 excludes input and output information that has already completed matching and updates the request information rij on the basis of not-granted input i and not-yet-allocated output j. According to one embodiment for updating information, each allocator 151, 153, or 155 resets all request information Rij (j=1 to N, N is the switch size) for input i that has already completed matching, to zero, and resets the request information Rij (i=1 to N, N is the switch size) corresponding to output j that has already completed matching to zero.

When updating information for scheduling is completed, each allocator 151, 153, or 155 repeats the remaining scheduling for the number of iteration, m (S620, S630). Each allocator 151, 153, or 155 transmits backward information bij to the information managing unit 110 for each time slot until the number of iterations to perform scheduling is terminated (S640). The transmitted backward information bij is reflected in the VOQ state information Lij. Also, the backward information bij may be transmitted to the information managing unit 110 each time the iteration is completed or after the scheduling is completed at each allocator 151, 153, or 155 according to implementation methods.

When the scheduling is completed at each allocator 151, 153, or 155, each allocator 151, 153, or 155 transmits the backward information bij and the grant information Gij corresponding to the scheduling result to the information managing unit 110 (S660).

The parallel scheduling apparatus and the parallel scheduling method according to the present invention may be applied to the existing algorithm that is used to perform iteration, including a scheduling algorithm in which output allocation information is reflected in request information of the next iteration. Also, since the first iteration for allocation to each time slot is performed by the first scheduling unit 130, it is possible to solve problems of long delay and low fairness caused by the parallel processing based matching algorithm in the related art, and also solve a redundancy problem between the first scheduling unit 130 and the each allocator 151, 153, or 155, thereby providing higher performance than the existing algorithm. Also, by providing pipelined parallel processing, it is possible to provide efficient scheduling in a packet switch having a long RTT time or having a very short time slot or cell size, such as an optical switch. In the above-described embodiments, the methods are described on the basis of a flowchart using a series of steps or units, but the present invention is not limited to the order of the steps, and some steps may occur in different steps and orders or simultaneously. It will also be appreciated by those skilled in the art that the steps depicted in the flowchart are not exclusive, that other steps may be included, or that one or more steps in the flowchart may be deleted without affecting the scope of the present invention.

Further, the parallel scheduling apparatus according to the present invention may be configured with hardware that is used together with a switching means (for example, a packet switch or an optical switch) to control the switching means according to parallel processing scheduling of input data. According to yet another embodiment, the parallel scheduling apparatus of the present invention may perform the function of the switching means by itself in accordance with the input data and the surrounding environment, in addition to controlling the switching means. That is, the parallel scheduling apparatus of the present invention is not a simple software configuration, but may be applied to all input/output devices that allow input data of the switching means to be transmitted as an output without collision.

The parallel scheduling according to the present invention has an advantage of improving the scheduling performance and lowering the implementation complexity. In addition, the present invention can ensure low delay and transmission fairness among VOQs at low input traffic. Further, the present invention has an advantage that can be applied to all scheduling algorithms that perform existing multi-iterations. In addition, the present invention can provide efficient scheduling in a packet switch having a long RTT time or having a very short time slot or cell size, such as an optical switch.

The above-described embodiments include examples of various aspects. Although it is not possible to describe all possible combination of various aspects, one of ordinary skill in the art will recognize that other combinations are possible. Accordingly, it is intended that the present invention include all alternatives, modifications and variations that fall within the scope of the following claims.

The above-described embodiments of the present invention can be implemented in the form of program instructions that can be executed through various computer components and recorded on a computer-readable recording medium. The computer readable medium may include program instructions, data files, data structures, and the like, alone or in combination. The program instructions recorded on the medium may be those specially designed and constructed for the embodiment, or may be available to those skilled in the art of computer software. Examples of computer-readable media include magnetic media such as hard disks, floppy disks and magnetic tape; optical media such as CD-ROMs and DVDs; magneto-optical media such as floppy disks; magneto-optical media, and hardware devices that are specially configured to store and execute program instructions such as ROM, RAM, flash memory, and the like. Examples of program instructions include machine language code such as those produced by a compiler, as well as high-level language code that can be executed by a computer using an interpreter or the like. The above-described hardware devices may be configured to operate as one or more software modules to perform processing according to the present invention, and vice versa.

While the present invention has been particularly shown and described with reference to exemplary embodiments and drawings, they are to be provided to help overall understanding of the present invention and not to limit the present invention to the disclosed exemplary embodiments, and various modifications and changes may be made by those skilled in the art to which the present invention pertains. Therefore, the spirit of the present invention should not be construed as being limited to the above-described embodiments, and following claims and all the equivalents of the claims are covered by the scope of the present invention.

What is claimed is:

1. A parallel scheduling apparatus comprising:
   an information managing unit generating first request information for scheduling;
   a first scheduling unit performing first scheduling, generating first matching information based on the first request information, and transmitting the first request information and the first matching information to a second scheduling unit; and
   the second scheduling unit performing second scheduling based on the first request information and the first matching information,
   wherein the first scheduling unit generates first backward information based on the first request information and the first matching information, wherein the first backward information is virtual output queue (VOQ) state information that is not subject to second scheduling among VOQ state information of inputs that are unsuccessful in scheduling as a result of the first scheduling.

2. The apparatus according to claim 1, wherein:
   the second scheduling unit includes k−1 allocators, and
   the second scheduling is performed by one allocator selected from among the k−1 allocators, where the k is a total number of scheduling allocators.

3. The apparatus according to claim 2, wherein the one allocator generates second request information for scheduling except at least one input and at least one output that have already completed scheduling by the first scheduling unit, on the basis of the first request information and the first matching information.

4. The apparatus according to claim 2, wherein the one allocator selected to perform the second scheduling is selected from among k−1 allocators according to a round-robin scheme.

5. The apparatus according to claim 3, wherein the one allocator selected to perform the second scheduling performs the second scheduling on the basis of the second request information.

6. The apparatus according to claim 5, wherein the one allocator selected to perform the second scheduling performs the second scheduling and then generates second matching information on the basis of the second request information.

7. The apparatus according to claim 6, wherein the one allocator selected to perform the second scheduling generates second backward information on the basis of the second request information and the second matching information, wherein the second backward information is VOQ state information of inputs that are unsuccessful in scheduling as a result of the second scheduling.

8. The apparatus according to claim 7, wherein the information managing unit updates the VOQ state information on the basis of the first request information, and the first backward information or the second backward information.

9. The apparatus according to claim 7, wherein after completing the second scheduling, the one allocator selected to perform the second scheduling transmits the second backward information and grant information to the information managing unit, the grant information indicating a result obtained by performing the second scheduling.

10. A parallel scheduling method performed by a parallel scheduling apparatus, the method comprising:
    a step of generating first request information for scheduling;
    a first scheduling step of performing first scheduling, generating first matching information based on the first request information, and transmitting the first request information and the first matching information to a second scheduling unit; and
    a second scheduling step of performing second scheduling based on the first request information and the first matching information,
    wherein the first scheduling step includes a step of generating first backward information based on the first request information and the first matching information, wherein the first backward information is virtual output queue (VOQ) state information that is not subject to the second scheduling among VOQ state information of inputs that are unsuccessful in scheduling as a result of the first scheduling.

11. The parallel scheduling method according to claim 10, wherein:
    the second scheduling step is performed by the second scheduling unit including k−1 allocators, and
    the second scheduling step is performed by one allocator selected from among the k−1 allocators, where the k is a total number of scheduling allocators.

12. The parallel scheduling method according to claim 11, wherein the one allocator selected to perform the second scheduling is selected from among k−1 allocators according to a round-robin scheme.

13. The parallel scheduling method according to claim 10, wherein the second scheduling step includes a step of generating second request information for scheduling except at least one input and at least one output that have already completed scheduling, on the basis of the first request information and the first matching information.

14. The parallel scheduling method according to claim 13, wherein in the second scheduling step, the second scheduling is performed on the basis of the second request information.

15. The parallel scheduling method according to claim 14, wherein in the second scheduling step, the second scheduling is performed and then second matching information is generated on the basis of the second request information.

16. The parallel scheduling method according to claim 15, wherein in the second scheduling step, second backward information is generated on the basis of the second request information and the second matching information, wherein the second backward information is VOQ state information of inputs that are unsuccessful in scheduling as a result of the second scheduling.

17. The parallel scheduling method according to claim 16, further comprising a step of updating the VOQ state information on the basis of the first backward information or the second backward information.

18. The parallel scheduling method according to claim 16, wherein the second scheduling step includes a step of generating the second backward information and grant information indicating a result obtained by performing the first scheduling and the second scheduling after completing scheduling.

* * * * *